United States Patent Office 3,626,708
Patented Dec. 14, 1971

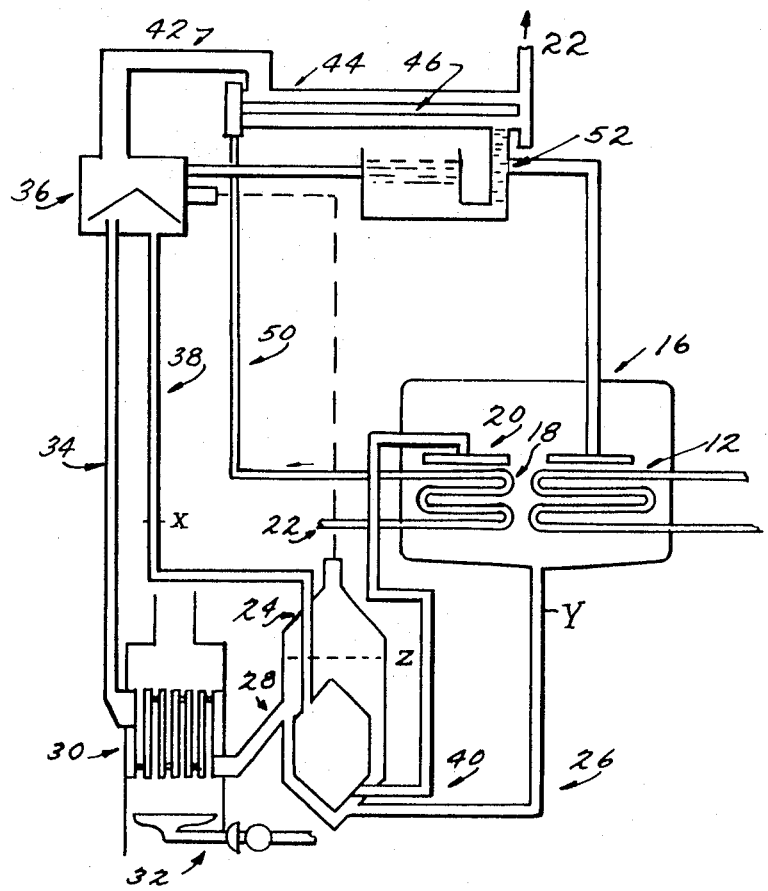

3,626,708
REDUCTION OF VAPOR PRESSURE IN ABSORPTION TYPE REFRIGERATION CYCLE
Chester C. Lyon, Evansville, Ind., assignor to Arkla Industries, Inc., Evansville, Ind.
Continuation-in-part of application Ser. No. 673,204, Oct. 5, 1967. This application Oct, 5, 1970, Ser. No. 78,305
Int. Cl. F25b 15/06
U.S. Cl. 62—112
2 Claims

ABSTRACT OF THE DISCLOSURE

An increase in the cooling capacity of an absorption-type refrigeration system employing water as refrigerant and a conventional aqueous salt solution as absorbent is obtained by incorporating a small amount of an additive which is ethylene glycol monobutyl ether and/or diethylene glycol monobutyl ether in the salt solution. The presence of the ether lowers the operating vapor pressure in the absorber section of this type of system and thereby effects a lower operating refrigerant temperature in the evaporator section.

---

This is a continuation-in-part of U.S. application Ser. No. 673,204, filed on Oct. 5, 1967, and now U.S. Pat. 3,553,135, entitled, Reduction of Vapor Pressure in Absorption Type Refrigeration Cycle.

This invention relates to two-pressure absorption refrigeration systems of the type employing an aqueous salt solution as the absorbent-refrigerant and in particular to the use of vapor pressure depressant in the form of an additive in the salt solution.

Refrigeration systems of the general type contemplated by the present invention, often referred to as two-pressure refrigeration systems, comprise a closed circuit containing an aqueous salt solution under high vacuum. Cooling is effected by vaporizing liquid refrigerant (water) within or on the outside of an evaporator coil or the like which forms part of the closed circuit. Air or other fluid medium is passed over or through the coil and thereby becomes chilled as it provides heat of vaporization to the refrigerant. The resulting refrigerant vapor passes to an absorber section where it is contacted with and absorbed into a stream of liquid absorbent which is conventionally a salt solution such as an aqueous solution of lithium and/or calcium halide (exclusive of fluoride) or nitrate, especially lithium chloride, lithium bromide, calcium chloride, calcium nitrate and the like. Heat liberated by the absorption process is removed by heat exchange with an external cooling medium. The resulting solution which has high refrigerant content passes to a generator section where it is heated by an external heat source to expel refrigerant (water) vapor. The resulting solution (absorbent) which has low refrigerant (water) content returns to the absorber section. The refrigerant (water) vapor is condensed by heat exchange with an external cooling medium and then again passes to the evaporator section.

The operation of a typical absorption circuit depends, among other things, on the reduction of the vapor pressure of the refrigerant (water) as it is absorbed into the absorbent (concentrated salt solution). The low pressure which is produced in the absorber section is, of course, transmitted to the evaporator section and causes the liquid refrigerant to evaporate until its temperaure drops to a value at which the refrigerant vapor pressure equals the pressure in the evaporator section. That is, the refrigerant temperature varies directly with absorber pressure. It is evident, therefore, that the cooling capacity of the circuit is directly related to absorber pressure, and for this reason it is the practice to employ an absorbent which has a low vapor pressure at the operating temperature of the absorber section.

Referring more specifically to the operation of this kind of system it has now been observed that the actual vapor pressure existing in the absorber section is somewhat higher than the equilibrium vapor pressure of the solution. That is, the measured vapor pressure during operation under dynamic conditions is higher than the vapor pressure of the same solution when measured under static, equilibrium conditions in the laboratory. The practical result of this phenomenon is that the refrigeration circuit has a lower cooling capacity than that which would be predicted on the basis of the equilibrium vapor pressure. This follows, of course, from the fact that the higher-than-expected pressure in the absorber section effects a correspondingly higher refrigerant temperature in the evaporation section.

The present invention is based on the discovery that the operating vapor pressure in the absorber section of a refrigeration system of the kind under discussion can be lowered toward the equilibrium vapor pressure by incorporating a small amount of an operating vapor pressure depressant selected from the group consisting of ethylene glycol monobutyl ether and diethylene glycol monobutyl ether and mixtures thereof in a conventional aqueous salt solution which is employed as the absorbent-refrigerant, which aqueous salt solution may contain from 30% to 65%, especially between 48% and 60%, e.g. between 54% and 59% by weight of salt, on an operating basis.

The selection of the ethers for the purpose of the present invention is not a straightforward or obvious matter, because the effect of an additive on the dynamic or operating vapor pressure of a solution is not predictable. The equilibrium vapor pressure of a solution is, of course, a well known property; however, equilibrium conditions do not exist in the absorber section of a refrigeration system. It has been found that the ethers employed in the present proportions in the present invention do not have any significant effect on the measured equilibrium vapor pressure of a conventional salt solution used as an absorber and that their depressant effect is associated solely and unexpectedly with the operating vapor pressure. In addition, the vapor pressure depressant should alter adversely the hysical properties of the solution, such as viscosity and solubility of the salt, as little as possible. Also, it must be nonreactive with the solution and with the equipment and must be heat stable under the operating conditions. All these considerations render the selection of a suitable depressant quite unpredictable.

The invention will be further understood from the following detailed discussion taken with the single figure which is a simplified schematic view of a conventional salt solution type absorption refrigeration system suitable for use in an air conditioning unit. The system is of typical construction except for the composition of the refrigerant-absorbent and need be described only in general terms. The cooling section of the closed refrigeration circuit is a refrigerant evaporator shown in the form of a coil 12, located in a vessel 16. Refrigerant liquid (water) flows over the coil 12 and vaporizes under subatmospheric pressure thereby extracting heat from whatever fluid medium flows through the coil 12. The resulting water vapor passes into an absorber which is illustrated in the form of a tubular heat exchanger coil 18 also located in vessel 16. Absorption liquid flows from a distributor 20 over the coils 18 and presents a large surface area over which absorption of water vapor takes place. Heat liberated by the absorption process is removed by a stream of cooling water 22 which flows inside the coil 18. The absorber liquid may be any of the conventional salt solutions and is suitably an aqueous solution of lithium bromide.

The resulting dilute salt solution flows downwardly by way of a heat exchanger 24 and lines 26 and 28 into a water vapor generator 30. In the generator 30 the dilute salt solution is heated to boiling temperatures by means of a gas burner 32 or the like so that water vapor is expelled from the solution. The boiling action is employed in a well known manner to lift a stream of the resulting concentrated solution and water vapor bubbles through a vapor lift tube 34 to a separator vessel 36.

In the separator vessel 36 concentrated solution separates from the water vapor and then flows downwardly through a line 38 to the heat exchanger 24 where it preheats the dilute salt solution before the latter passes to the generator 30. The cooler concentrated solution then flows upwardly through a line 40 to the absorber distributor 20.

The water vapor in the separator 36 passes through a line 42 to a condenser 44 where it is condensed by giving up heat to the cooling water 22 flowing through the passage 46. As shown, the cooling water flows by a conduit 50 connecting the absorber coil 18 with condenser passage 46. The stream of condensed water flows from the condenser 44 through an orifice 52 to the evaporator 12 where it again vaporizes to effect the desired cooling action of the system.

The system operates to a large degree through the careful maintenance of pressure differfentials between different parts of the system. The orifice 52 maintains a pressure differential between the low pressure in the vessel 16 and the higher pressure in the condenser 44. Liquid columns formed in the lines 38 and 26 maintain a pressure differential between the generator 30 and the separator 36 on the one hand, and the absorber 18 on the other. Exemplary levels of the top of the liquid columns in lines 38 and 26 are indicated by the letters X and Y, respectively, and Z indicates an exemplary liquid level in the outer chamber of the heat exchanger 24.

All of the above description of the figure is applicable to conventional absorption refrigeration systems generally and has been given in order that the concept of the present invention may be presented in its proper environment. A more detailed discussion of the operation of the absorber 18 will aid in clarifying the invention. When refrigerant vapor (water vapor) enters the absorber it is absorbed into the surface layer of the absorbent solution which is flowing downwardly over the heat exchanger core 18. The absorption process releases heat which raises the temperature of the surface layer of the liquid. In addition, the surface layer becomes richer in refrigerant (more dilute in terms of salt concentration). Both of these actions raise the vapor pressure of the surface layer although they are offset to a degree by the conduction of the heat from the liquid and eventually to the cooling water 22 and by the mixing or diffusion of the surface layer with the interior of the liquid. The overall result is that an operating or dynamic pressure exists which is somewhat higher than the equilibrium vapor pressure of the solution. That is, in practice the operating refrigerant temperature will be somewhat higher than the refrigerant temperature which corresponds to the equilibrium vapor pressure of the solution in the absorber.

From the above, it can be seen that the present additives may be used in any of the conventional absorption-type refrigeration systems as described and the additives are likewise useful with the conventional salt solutions used therewith, e.g. lithium halides (except fluoride which is not sufficiently soluble to be of commerical importance) lithium nitrate, lithium sulfate, calcium halide (except, again, the fluoride) and calcium nitrate and mixtures of the foregoing in any desired proportions. The concentrations of the salt or salts in the aqueous salt solution charged to the refrigeration system may vary widely depending on the particular application to which the refrigeration system is put, but generally the salt solutions (as charged) will vary from as low as 30% by weight to as high as 60% by weight, especially between 40% and 55% by weight and usually between 45% and 50% by weight. Especially useful are lithium chloride, bromide and iodide, sulfate and nitrate, and calcium chloride, bromide, iodide and nitrate.

EXAMPLE 1

As an example of the effectiveness of the invention, a refrigeration system embodying the essential elements of the system illustrated in the drawing was operated using as the absorbent-refrigerant 65 pounds of aqueous lithium bromide salt solution having dissolved therein 39 pounds of lithium bromide and having an equilibrium vapor pressure which would be expected to produce a temperature of 42° F. in the evaporator. Actually the refrigerant temperature during operation was 47.8° F. Then 75 cc. of ethylene glycol monobutyl ether (corresponding to .002% by weight) was added to the salt solution, and the system was again operated. The refrigerant temperature was measured and found to be 42° F. The equilibrium vapor pressure of the same salt solution, but which contained about 0.1% by weight of the ether based on total weight of the solution, was measured and found to be essentially the same as that of the salt solution having no ether therein.

EXAMPLE 2

In another test a similar but larger refrigeration system was operated using 385 pounds of a lithium bromide salt solution having dissolved therein 230 pounds of lithium bromide and which had an equilibrium pressure corresponding to a refrigerant temperature of 41° F. The actual operating refrigerant temperature was 45° F. After 200 cc .of ethylene glycol monobutyl ether were added to the salt solution (corresponding to .001% by weight), the refrigerant temperature dropped to 41° F. The equilibrium vapor pressure of the treated salt solution, which contained about 0.1% by weight ether based on total solution, was measured and found to be essentially the same as that of the untreated salt solution.

EXAMPLE 3

In a further example, the addition of 0.002% by weight of ethylene glycol monobutyl ether to a mixed salt solution of lithium bromide and lithium chloride in a proportion by weight of 2 to 1, was used in the same manner as Example 1 in a refrigeration unit and resulted in a 13% increase in the capacity of the unit. Addition beyond about 0.5% of the ether resulted in little or no increase in capacity as compared with additions below 0.5%, and as the concentration was increased to more than 1.0% the capacity of the unit dropped to less than its capacity before the ether was added.

Hence, the range of effective proportions of the two ethers is about 0.001% to about 1% by weight based on total solution. Above the upper limit the performance is adversely affected with an increase in ether content. Below the lower limit the depressant effect is too small to be of practical effect.

EXAMPLE 4

A unit as described in Example 1 was charged with a solution of lithium bromide and calcium chloride. The calcium chloride was present to the extent of 20% by weight of the total salt and the salt concentration was 52% by weight. The unit was operated with 85° F. inlet condensing water and a constant heat input. Chilled water was circulated at the rate of 9.5 gallons per minute. The entering chilled water temperature was 51.4° F. and the leaving water temperature was 45.3° F. The difference, 6.1°, corresponds to a capacity of 29,000 B.t.u. per hour. Ethylene glycol monobutyl ether was then added in the amount of 0.1% by weight of the total charge. Entering water temperature was then 53.5° F. and leaving water 45.1° giving an 8.4° F. difference. This corresponds to 40,000 B.t.u. per hour or a 38% increase in capacity.

The unit was drained, flushed and recharged with a solution of lithium bromide and lithium nitrate, the latter being present to the extent of 16% by weight of the total salt and the total salt concentration being 49.6% by weight. The unit was operated with 85° F. inlet condensing water, constant heat input, and a constant chilled water flow rate of 9.5 gallons per minute. Entering chilled water temperature was 51.6° F. and leaving water was 46.2° giving a 5.4° differential corresponding to 25,600 B.t.u./hr. Ethylene glycol monobutyl ether in the amount of 0.12% by weight of the total charge was then added. Entering water temperature was then 53.7° F. and leaving water 46.2. The difference, 7.5°, corresponds to a capacity of 35,600 B.t.u./hr. or a 39% increase in capacity.

EXAMPLE 5

When a corresponding amount of calcium bromide is used in place of the lithium bromide of Example 1, similar results are obtained.

The examples have been described by way of illustration only.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:

1. In a method of effecting refrigeration by containing an aqueous salt solution in a closed circuit, expelling water vapor from the solution by heating the same thereby forming a concentrated salt solution, condensing the water vapor, evaporating the condensed water to absorb heat from the surroundings, absorbing the water vapor in the concentrated salt solution at low pressure and repeating the cycle, the improvement which comprises providing in said aqueous salt solution an operating vapor pressure depressant selected from the group consisting of ethylene glycol monobutyl ether and diethylene glycol monobutyl ether and mixtures thereof, thereby reducing the operating temperature of the evaporating refrigerant.

2. A method as in claim 1 wherein said vapor pressure depressant is provided in said salt solution in the range of 0.001 weight percent to 1.0 weight percent based on total solution.

References Cited

UNITED STATES PATENTS

| | | | |
|---|---|---|---|
| 1,734,278 | 11/1929 | Tandberg et al. | 62—112 X |
| 1,914,222 | 6/1933 | Taylor | 62—112 X |
| 2,090,905 | 5/1936 | Zellhoefer | 62—112 X |
| 2,163,899 | 6/1939 | Walker et al. | 252—69 |
| 3,276,217 | 10/1966 | Bourne et al. | 62—112 X |
| 3,296,814 | 1/1967 | Lynch et al. | 62—112 |
| 3,388,557 | 6/1968 | Modahl et al. | 62—112 |
| 3,553,136 | 1/1971 | Lyon | 62—112 X |

WILLIAM F. O'DEA, Primary Examiner

P. D. FERGUSON, Assistant Examiner

U.S. Cl. X.R.

62—476